May 6, 1952 W. C. SCOTT 2,595,305
ROLLING, STAMPING, AND CUTTING MACHINE FOR DOUGH
Filed June 13, 1947 3 Sheets-Sheet 1

Inventor
William C. Scott

By *Clarence A. O'Brien and Harvey B. Jackson*
Attorneys

May 6, 1952   W. C. SCOTT   2,595,305
ROLLING, STAMPING, AND CUTTING MACHINE FOR DOUGH
Filed June 13, 1947   3 Sheets-Sheet 2
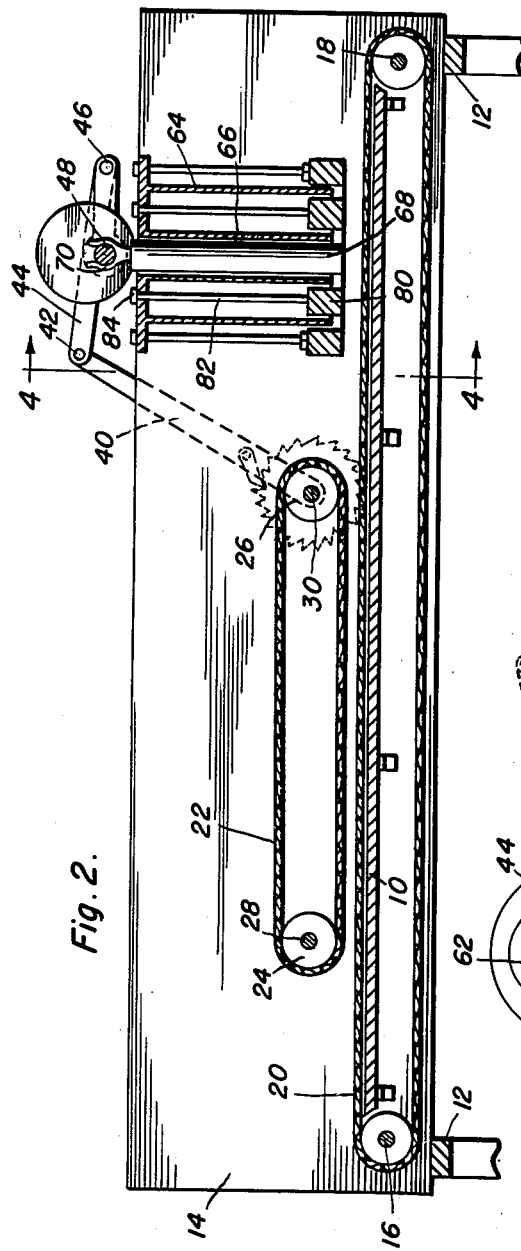
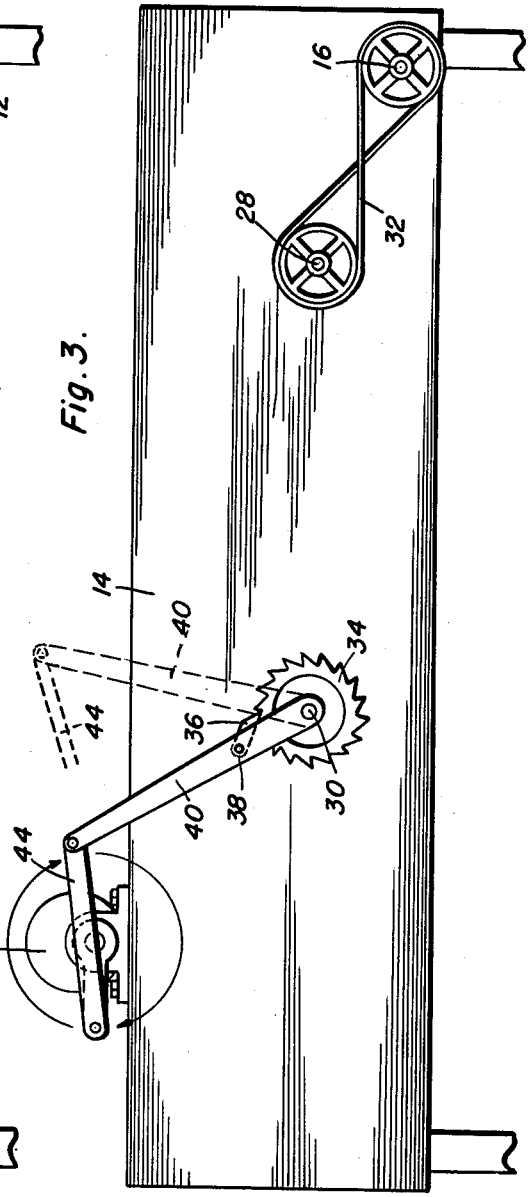
Inventor
William C. Scott
By Clarence A. O'Brien
and Harvey B. Jacobson
Attorneys Inventor
William C. Scott Patented May 6, 1952

2,595,305

UNITED STATES PATENT OFFICE 2,595,305

ROLLING, STAMPING, AND CUTTING MACHINE FOR DOUGH

William C. Scott, Coeur d'Alene, Idaho, assignor, by direct and mesne assignments, to Pelton's Spudnuts, Incorporated, Salt Lake City, Utah, a corporation of Utah Application June 13, 1947, Serial No. 754,518

2 Claims. (Cl. 107—26)

This invention relates to novel and useful improvements in a rolling, stamping and cutting machine for dough and more specifically has reference to an apparatus for stamping, cutting and forming bakery products by rolling a mass of dough into a thin sheet of material, and automatically cutting blanks or shapes therefrom suitable for subsequent treatment in bakery.

The principal objects of this invention reside in providing an apparatus of the character above set forth having a novel and improved construction of dies or cutters for stamping, cutting and forming predetermined shapes from a sheet of dough; wherein automatic means are provided for disengaging the severed portions of dough from the cutters; wherein an improved connecting means is provided between the cutting mechanism and the dough conveying means; and wherein there is further provided an efficient arrangement for kneading a mass of dough and pressing the same into a thin sheet of material before passing this sheet beneath the cutting mechanism.

Further imporant purposes of the invention reside in providing an apparatus in accordance with the preceding objects, wherein a simplified and improved means is provided for mounting and supporting the dough cutters; wherein the dough ejecting means is compactly disposed within the cutters and automatically actuated therefrom in predetermined timed relation thereto; and wherein a simplified and efficient step-by-step mechanism is provided for actuating the dough kneading and conveying means in predetermined synchronization with the cutting mechanism.

These, together with various ancillary objects of the invention which will later become apparent as the following description proceeds, are attained by this device, a preferred embodiment of which has been illustrated, by way of example only in the accompanying drawings, wherein:

Figure 2 is a vertical longitudinal sectional view taken on the line 2—2 of Fig. 4, but showing the working parts in the position of Fig. 1;

Figure 3 is a side elevational view taken from the left side of Figure 1, certain alternative positions of parts of the mechanism being indicated in dotted line;

Figure 1:
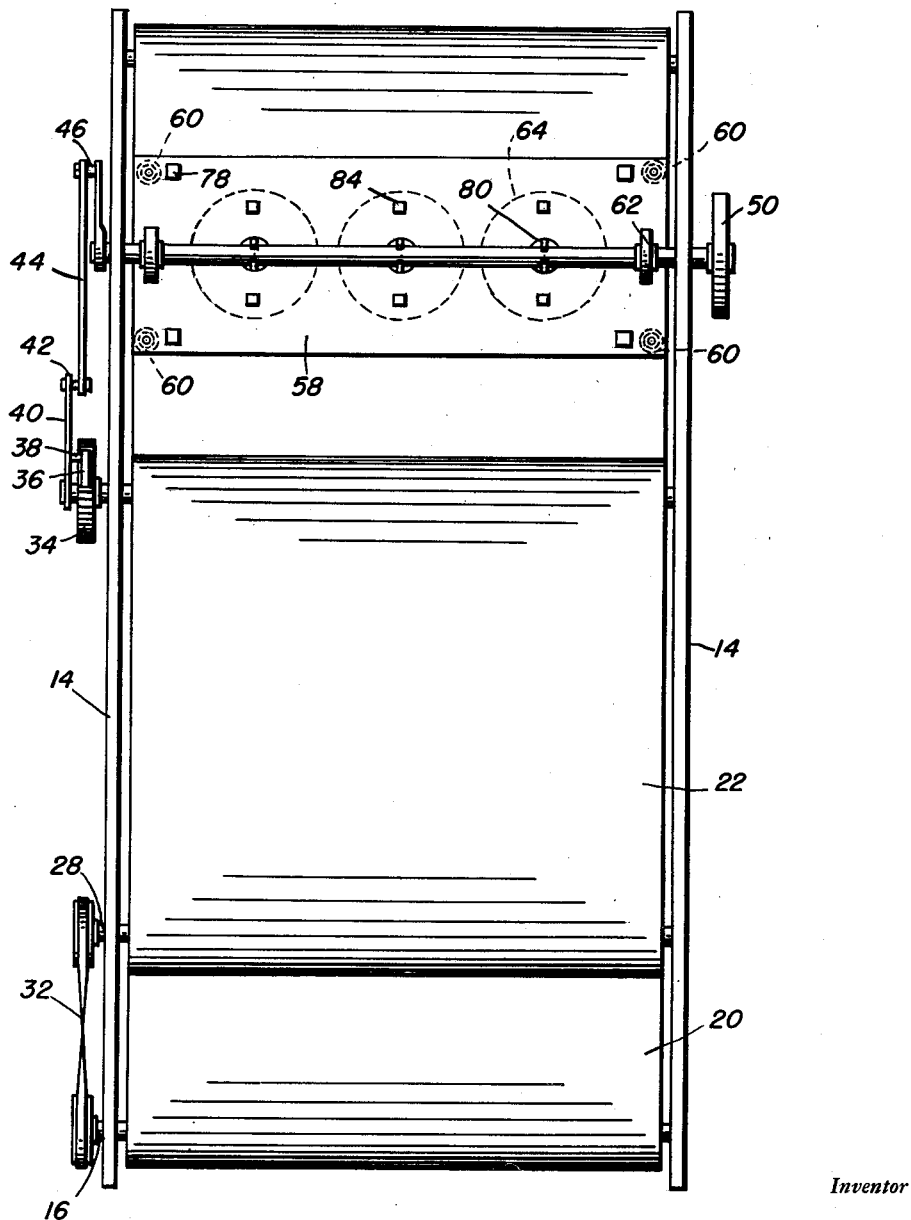
Figure 1 is a top plan view of the machine of the invention showing the working parts in positions assumed at the upper limit of the operating stroke of the cutters.

Referring now more specifically to the accompanying drawings, wherein like numerals designate similar parts throughout the various views, 10 designates a bed or platform of any suitable type and constituting a support for handling the mass of dough as set forth hereinafter, which platform comprises a part of a table having supporting legs 12, together with side walls 14.

A pair of shafts 16 and 18 are suitably journalled in the side walls 14 immediately adjacent the ends of the platform or bed 10, and are provided with rollers over which is entrained a flexible endless conveyor such as a belt 20 or the like. The upper flight of this belt, as shown in Figure 2, overlies and rests upon the supporting platform 10 over which it passes, while the lower flight of this belt freely passes therebeneath. Disposed parallel to and spaced slightly above the belt 20 is a second endless belt 22 entrained over rollers 24 and 26 carried by axles 28 and 30 suitably journalled in the side walls 14 of the machine. As shown best in Figure 3, the axles 28 and 16 extend through a side wall 14 and are provided with suitable pulleys which are connected by a crossed belt 32, whereby the lower belt 20 is driven in a reverse direction from the upper belt 22 in a manner to be set forth hereinafter.

The other axle 30 of the upper belt 22 likewise extends through the side wall 14 and is provided with a ratchet wheel 34 constituting a means for rotating the shaft 30, the belt 22 and by means of the connection 32, the lower belt 20. The ratchet wheel 34 is operated intermittently in a step-by-step manner by a pawl 36 which is pivoted as at 38 to a lever 40, the lower end of this lever being journalled upon the axle 30 for oscillation thereabout as indicated in dotted lines in Figure 3.

The upper end of lever 40 is journalled as at 42 to the end of a pitman 44 constituting a connecting rod whose other extremity is journalled as at 46 to a crank arm on the lay shaft 48.

Figure 4:
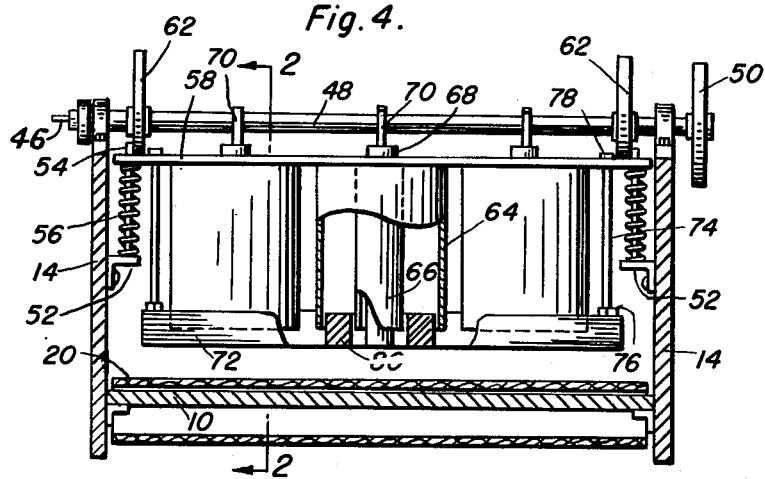
Figure 4 is transverse vertical sectional view through the cutting mechanism, taken substantially upon the plane of the section line 4—4 of Figure 2, the working parts being shown at the upper limit of the stroke of the cutters, and certain of the parts being broken away to show the interior construction thereof.

This lay shaft 48 is suitably journalled in bearings carried by the upper edges of the side walls 14, and extends transversely across the side walls and is spaced above the supporting bed 10 and the conveyor belt 20 as shown in Figures 2 and 4.

One extremity of the shaft 48 extends beyond the side walls and is provided with a driving wheel 50 for rotation of the shaft from any suitable power source, not shown, while the other end of the shaft extends beyond the other side wall and is provided with the above mentioned crank arm having the crank throw 46. As will be evident, the shaft 48 is intended to be continuously rotated by the driving pulley or wheel 50, and through the ratchet and pawl mechanism imparts an intermittent, step-by-step rotation in opposite directions, to the shafts 28 and 30 of the upper belt 22 and shafts 16 and 18 of the lower belt 20 whereby the lower flight of belt 22 and the upper flight of belt 20 rotate in the same direction.

It should be here noted that the two belts are spaced vertically a sufficient distance and are rotated in opposite directions, to impart a kneading or rolling action to a mass of dough which is passed thereunder by the conveyor belt 20, thereby serving to compress this mass into a relatively thin sheet of predetermined thickness, which sheet is then passed between the cutter means to be now described, whereupon predetermined shapes or forms are cut from this sheet of material and the shapes so cut, together with the waste material are then delivered by the conveyor 20 for any suitable purpose.

As shown best in Figure 4, the side walls 14 are provided with longitudinally extending angle iron support brackets 52 which if desired may be adjustable longitudinally and vertically of the supporting side walls in any suitable manner, each of which brackets is provided with a plurality of upwardly extending guide rods 54 surrounded by coil springs 56.

A generally rectangular upper plate 58 is provided with suitable apertures 60 for receiving the guide rods 54, whereby the plate is supported by the springs 56 and may be vertically reciprocated upon the guide rods.

Figure 5:
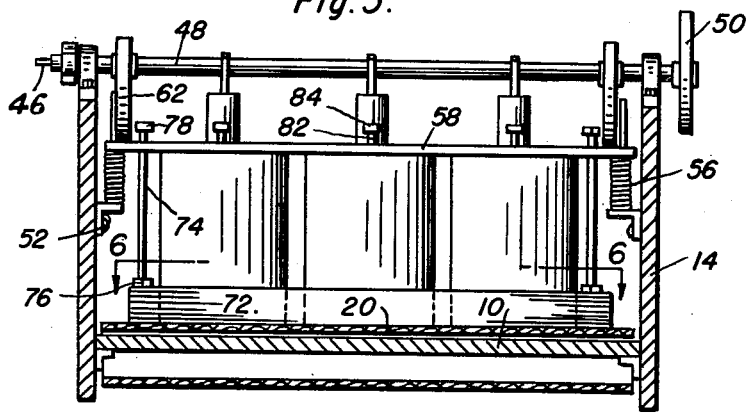
Figure 5 is a view similar to Figure 4, but showing the working parts in the position assumed at the lower limit of the stroke of the cutters; and, Figure 6 is a horizontal sectional view taken substantially upon the plane of the section line 6—6 of Figure 5.
Figure 6:
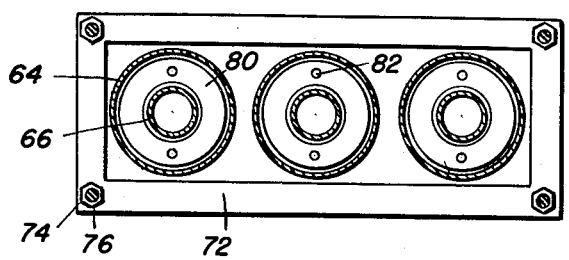

The rotating shaft 48 is provided with a plurality of cams 62 which are engageable with the upper surface of the plate 58, whereby the latter is reciprocated against the action of the springs 56 once for each revolution of the shaft 48. Rigidly secured to the undersurface of the plate 58 in any suitable manner such as by welding or the like, are a plurality of depending dough cutting elements, preferably consisting of concentric annular outer and inner cutters 64 and 66 respectively. Depending guide rods 68 are loosely received within the inner annular cutters 66 for guiding the cutter members during their vertical reciprocation under the actuation of the cams 62, the guide elements 68 being provided with yokes 70 for journalling and supporting the guides from the rotatable shaft 48. A generally rectangular hollow frame 72 is supported at its four corners by upwardly extending bolts 74 and adjusting nuts 76 on the lower threaded ends thereof, these bolts being provided with upper headed portions 78 upon the upper surface of the above mentioned plate 58. The bolts 74 are loosely received in suitable apertures in the plate 58, whereby the frame member 72 may be vertically reciprocated relative to the carrying plate 58, as indicated in Figures 4 and 5.

In the annular space between the inner and outer cutter elements 66 and 64 respectively, are provided annular weighted dough ejecting means 80, which are freely reciprocable between the cutter elements. Each of the annular members 80 is supported as by rods 82 extending through the plate 58, these rods having headed upper portions 84 as shown in Figure 2.

The arrangement is such that as the shaft 48 rotates, the cams 62 depress plate 58 together with the attached depending cutter elements 64 and 66, against the normal lifting action of the springs 56, until the cutter elements engage a sheet of dough carried by the conveyor belt 20 and disposed beneath the cutters. The parts being in the position shown in Figure 4, are lowered until they engage the dough, contact first being established by the rectangular frame 72 and the weight ejecting members 80.

Upon further downward travel of the cutters, the rectangular frame 72 and weights 80 rest upon the surface of the dough, and the cutters pierce and penetrate the same to sever the desired forms therefrom. This additional downward movement of the cutters is permitted by the lost motion connection between the rectangular frame and weight supporting rods 74 and 82 which are freely slidable in the supporting plate 58.

This downward reciprocation of the cutter elements has occupied about 180 degrees of rotation of the shaft 48, this movement being effected by the eccentric means 62 as will be apparent from an inspection of Figure 2. At the beginning of this downward movement of the cutters, the connecting rod 44 and lever 40 will be disposed in their extreme right hand position as viewed in Figure 2 or their left hand position as viewed in Figure 3. Upon further rotation of the shaft, the crank throw 46 will cause an outward movement of the lever 40 relative to the shaft 48, whereby the pawl 36 engaging the ratchet wheel 34, causes rotation of the shaft 30 and through the previously mentioned associated driving mechanism, causes reverse rotation of the belts 22 and 20. As will be seen, this rotation of the conveyor belt and the kneading or dough pressing and rolling belt, is synchronized with the rotation of the shaft 48 and operation of the cutters, whereby the belts, and severed and unsevered portions of dough carried thereby, are advanced a predetermined distance during this latter one-half revolution of the shaft 48. When the latter has completed its first half revolution, the lever 40 is now reversed in its oscillation and moved towards the shaft 48, on the downward stroke of the cutters as previously mentioned. As will be seen, during this initial 180 degrees of rotation of shaft 48, the lever 40 is released from driving engagement with the ratchet wheel 34, whereby the belts remain stationary during the stamping and cutting operation.

As the eccentrics 62 complete the last half of their rotation, the spring means 56 are permitted by the withdrawing eccentrics to elevate the plate 58 and the cutter elements attached thereto. This upward movement withdraws the cutters from the mass of dough, and after taking up the predetermined amount of lost motion in the rods 74 and 82, carry the rectangular weighted frames 72 and annular members 80 therewith on the remainder of their upward travel until the parts assume the position shown in Figure 4. During the latter part of this upward travel, it will be seen that there is a relative downward reciprocation of the weighted ejecting means 80, relative to the concentric annular cutters 64 and 66, whereby the ejecting means force out any of the severed portions of dough adhering to the cutter elements. For this purpose, the annular members 80 are constructed of sufficient mass to readily perform their intended functions.

From the foregoing, it is believed that the manner of operating and constructing the device will be readily understood, and accordingly further explanation is believed to be unnecessary.

Since numerous modifications will readily occur to those skilled in the art after a consideration of the foregoing specification and annexed drawings, it is not intended to limit the invention to the exact construction shown and described, but all suitable modifications and equivalents may be resorted to, falling within the scope of the appended claims.

Having described the invention what is claimed as new is:

1. In a cutting machine for sheets of dough, means for supporting a sheet of dough; a cutter head reciprocable toward and away from said dough supporting means, said cutter head having a plurality of sets of concentric cutters carried thereby; ejector means carried by and reciprocable relative to said head, said ejector means including an annular ejector reciprocable between the concentric cutters of each set, for discharging the severed portions of dough therefrom; an ejector plate surrounding the sets of cutters for removing the sheet of dough from around the cutters, said plate being mounted for limited reciprocation relative to said head; guide means slidably received within the inner cutter of each set; and means independently supporting said guide means above said cutter head, so said guide means depends into the respective cutters.

2. Cutting and stripping mechanism for dough sheeting machines equipped with a table member over which the finished dough sheet is discharged, comprising fixed supports disposed at opposite sides of said table member and rising above the dough sheet supporting surface thereof; a drive shaft extending between and journaled in fixed relationship with said supports above and transversely of said table member; a cutter mounting resiliently supported by said supports and between said table member and said shaft for limited reciprocative movement toward and away from the dough sheet supporting surface of said table members; a plurality of sets of cutters depending in side-by-side fixed relationship from said cutter mounting, each of said sets comprising two independent but substantially concentrically arranged cutters; annular followers suspended between the outer and inner cutters of respective sets as dough ejectors; guide members journaled on said shaft and depending therefrom into the inner cutters of respective sets; cam means fixed to said shaft for action against said cutter mounting as said shaft rotates; and means for rotating said shaft.

WILLIAM C. SCOTT.

REFERENCES CITED

The following references are of record in the file of this patent:

UNITED STATES PATENTS

| Number | Name | Date |
|---|---|---|
| 943,364 | McConnell et al. | Dec. 14, 1909 |
| 998,017 | Laukhuff | July 18, 1911 |
| 1,589,548 | O'Byrne | June 22, 1926 |
| 1,753,217 | Piekos | Apr. 8, 1930 |